(12) United States Patent
Rode

(10) Patent No.: US 8,650,757 B2
(45) Date of Patent: Feb. 18, 2014

(54) METHODS FOR PRELOADING A BEARING AND ALIGNING A LOCK NUT

(71) Applicant: John E. Rode, Fonda, NY (US)

(72) Inventor: John E. Rode, Fonda, NY (US)

( * ) Notice: Subject to any disclaimer, the term of this patent is extended or adjusted under 35 U.S.C. 154(b) by 0 days.

(21) Appl. No.: 13/683,571

(22) Filed: Nov. 21, 2012

(65) Prior Publication Data

US 2013/0145621 A1 Jun. 13, 2013

Related U.S. Application Data

(62) Division of application No. 12/492,826, filed on Jun. 26, 2009, now Pat. No. 8,316,530.

(51) Int. Cl.
*B21D 53/10* (2006.01)

(52) U.S. Cl.
USPC ......... 29/898.09; 29/252; 29/724; 29/898.07; 411/14.5

(58) Field of Classification Search
USPC ............... 29/724, 252, 898.09, 898.07, 803, 29/894.01, 264, 263; 384/540; 411/14.5
See application file for complete search history.

(56) References Cited

U.S. PATENT DOCUMENTS

| | | | |
|---|---|---|---|
| 518,328 A | 4/1894 | Oakey |
| 578,276 A | 3/1897 | Strauss et al. |
| 1,352,643 A | 9/1920 | Young |
| 1,366,273 A | 1/1921 | Nettlefold |
| 1,373,489 A | 4/1921 | Cochran |
| 1,384,655 A | 7/1921 | Allmon |
| 1,440,938 A | 1/1923 | Sieroslawski |
| 1,755,807 A | 4/1930 | Boles |
| 1,758,515 A | 5/1930 | Heiermann |
| 2,301,786 A | 11/1942 | Millermaster |
| 2,426,219 A | 8/1947 | Jackson |
| 2,755,698 A | 7/1956 | Wurzel |
| 2,769,360 A | 11/1956 | Woodford et al. |
| 2,813,732 A | 11/1957 | Hird |
| 3,144,909 A | 8/1964 | Hart et al. |
| 3,241,409 A | 3/1966 | Raptis |
| 3,464,474 A | 9/1969 | Jansen |
| 3,480,300 A | 11/1969 | Jeffrey et al. |

(Continued)

FOREIGN PATENT DOCUMENTS

| DE | 3905385 A1 | 8/1990 |
|---|---|---|
| EP | 1367299 A2 | 12/2003 |

(Continued)

OTHER PUBLICATIONS

Search Report for related application GB0701360.0.

(Continued)

*Primary Examiner* — Richard Chang
(74) *Attorney, Agent, or Firm* — Heslin Rothenberg Farley & Mesiti P.C.; Nicholas Mesiti, Esq.; Victor A. Cardona, Esq.

(57) ABSTRACT

An apparatus for providing a load on a bearing mounted to a shaft includes an attaching member and a press mechanism. The attaching member is releasably connected to the shaft. The press member is coupled to the attaching member and is configured to provide a compressive load to the bearing. The press mechanism includes an aligning arm configured to engage a shaft slot of the shaft to align the press mechanism relative to the shaft when the attaching member connects to the shaft.

4 Claims, 12 Drawing Sheets

(56) References Cited

U.S. PATENT DOCUMENTS

| | | | |
|---|---|---|---|
| 3,581,609 | A | 6/1971 | Greenwood |
| 3,664,226 | A | 5/1972 | Gonzalez |
| 3,678,981 | A | 7/1972 | Heyworth |
| 3,742,568 | A | 7/1973 | Hahlbeck |
| 3,762,455 | A | 10/1973 | Anderson, Jr. |
| 3,844,323 | A | 10/1974 | Anderson, Jr. |
| 3,986,750 | A | 10/1976 | Trent et al. |
| 4,048,897 | A | 9/1977 | Price, Jr. |
| 4,210,372 | A | 7/1980 | McGee et al. |
| 4,305,438 | A | 12/1981 | Spinosa et al. |
| 4,812,094 | A | 3/1989 | Grube |
| 4,958,941 | A | 9/1990 | Imanari |
| 4,971,501 | A | 11/1990 | Chavez |
| 5,011,306 | A | 4/1991 | Martinie |
| 5,058,424 | A | 10/1991 | O'Hara |
| 5,070,621 | A | 12/1991 | Butler et al. |
| 5,129,156 | A | 7/1992 | Walker |
| 5,180,265 | A | 1/1993 | Wiese |
| 5,348,349 | A | 9/1994 | Sloane |
| 5,349,736 | A * | 9/1994 | Rubino et al. ............... 29/426.5 |
| 5,362,111 | A | 11/1994 | Harbin |
| 5,366,300 | A | 11/1994 | Deane et al. |
| 5,533,849 | A | 7/1996 | Burdick |
| 5,535,517 | A | 7/1996 | Rode |
| 5,597,058 | A | 1/1997 | Ewer |
| 5,877,433 | A | 3/1999 | Matsuzaki et al. |
| 5,882,044 | A | 3/1999 | Sloane |
| 6,058,767 | A | 5/2000 | Calvin |
| 6,065,920 | A | 5/2000 | Becker et al. |
| 6,186,032 | B1 | 2/2001 | Raines |
| 6,286,374 | B1 | 9/2001 | Kudo et al. |
| 6,520,710 | B2 | 2/2003 | Wells |
| 6,598,500 | B1 | 7/2003 | Chivington |
| 6,637,297 | B1 | 10/2003 | Mlynarczyk |
| 6,749,386 | B2 | 6/2004 | Harris |
| 6,857,665 | B2 | 2/2005 | Vyse et al. |
| 6,976,817 | B1 | 12/2005 | Grainger |
| 6,993,852 | B2 | 2/2006 | Russell et al. |
| 7,303,367 | B2 | 12/2007 | Rode |
| 7,343,836 | B1 | 3/2008 | Ward |
| 7,346,985 | B1 | 3/2008 | Strait |
| 7,389,579 | B2 * | 6/2008 | Rode ............................. 29/724 |
| 7,428,779 | B2 | 9/2008 | Smith et al. |
| 2002/0110414 | A1 | 8/2002 | Wells |
| 2003/0035699 | A1 | 2/2003 | Harris |
| 2004/0086354 | A1 | 5/2004 | Harris |
| 2004/0089113 | A1 | 5/2004 | Morgan |
| 2005/0025604 | A1 | 2/2005 | Slesinski et al. |
| 2005/0207865 | A1 | 9/2005 | Disantis et al. |
| 2006/0008340 | A1 | 1/2006 | Cox |
| 2007/0177829 | A1 | 8/2007 | Rode |
| 2007/0211973 | A1 | 9/2007 | Rode |
| 2007/0286699 | A1 | 12/2007 | Rode |
| 2010/0326205 | A1 | 12/2010 | Rode |

FOREIGN PATENT DOCUMENTS

| | | |
|---|---|---|
| GB | 2286231 A | 8/1995 |
| GB | 2434621 B | 8/2007 |
| GB | 2435499 B | 8/2007 |

OTHER PUBLICATIONS

Examiner's Report for related application AU2007200331.

"STEMCO Pro-Torq (R) Advanced Axle Spindle Nuts 09-571-0006," Instruction guide, Copyright Aug. 2003, 2 pages.

"STEMCO Pro-Torq(R) 571-2970," Copyright 2005 STEMCO LP, 2 pages.

"Timkin Products—Bearings," vol. One, Issue 6; 2 pages, [http://www.timken.com/products/bearings/techtips/tip6.asp].

Timken Tech Tips: Promoting Safe, Proper Bearing Handling Practices for the Heavy-Duty Market; "Preload in Wheel Bearing" vol. 6, Issue 3, 2 pages, [http://www.Timken.com/products/bearings/techtipsPDFs/Vol6No3.pdf#search='Bearing%20Preload].

"Forming and Shaping Processes Compaction and Sintering (Pulvepresning)," Copyright Istitut for Precesteknik Danmarks Tekniske Universitet 1996. (http://www.ipt.dtu.dk/-ap/ingpro/fprming/ppm/htm).

STEMCO, Pro-Torq. An Axle Spindle Nut System for Today's Fleets. Mar. 2003; download from http://www.stemco.com, pp. 38-41.

STEMCO, Pro-Torq. An Axle Spindle Nut System for Today's Fleets. Mar. 2003; download from http://www.stemco.com, pp. 57-64.

What is Powder Metallurgy? Dec. 2004, 2 pages. (https://www.mpif org/technology/whatis.html).

\* cited by examiner

METHODS FOR PRELOADING A BEARING AND ALIGNING A LOCK NUT

CROSS-REFERENCE TO RELATED APPLICATION

This application is a Divisional of U.S. Ser. No. 12/492,826 filed on Jun. 26, 2009, entitled "Systems and Methods for Preloading a Bearing and Aligning a Lock Nut", and published as U.S. Publication No. 2010/0326205 A1 on Dec. 30, 2012, the entire disclosure of which is incorporated herein by reference. This application also relates to U.S. application Ser. No. 11/341,948, filed Jan. 27, 2006, and titled "Method And Apparatus For Preloading A Bearing," issued as U.S. Pat. No. 7,559,135 on Jul. 14, 2009; and U.S. application Ser. No. 11/354,513, filed Feb. 15, 2006, and titled "Method, Apparatus, and Nut for Preloading a Bearing", issued as U.S. Pat. No. 7,389,579 on Jun. 24, 2008, both of which are incorporated herein by reference.

TECHNICAL FIELD

The present invention relates, generally, to methods and apparatus for preloading antifriction bearings in drive trains, particularly, to preloading and adjusting bearings while monitoring the preload being applied.

BACKGROUND OF THE INVENTION

Various means have been devised to simplify the adjustment of axle bearings, specifically, truck axle bearings. It is generally accepted that in some bearing installations, for example, axle bearings, the life of the bearing will be optimized if the adjustment is made for a slight axial compressive deflection, for example, about 0.003 inches (where this amount is the compressive deflection of the two bearings combined), which is often referred to as "a three thousandths preload." Typical prior art methods of creating these preloads are obtained by applying specified torques to the bearing assembly, for example, by tightening the nut that retains the bearings. However, for several reasons, it is typically extremely difficult to achieve such preload settings under actual in-field conditions, such as in a mechanic shop. For example, the assembly of a heavy truck wheel onto a wheel hub assembly is a relatively cumbersome procedure that hinders the mechanic. Moreover, the wheel hub assembly always includes at least one inner seal, usually a lip type of seal, which can impose a resistive drag torque component to the preload torque, particularly when the seal is new.

Lock nut systems are often utilized to retain a wheel or hub assembly, including axle bearings, on a shaft. Such lock nut systems may be connected to a shaft and inhibit rotation of a retaining nut relative to such shafts. For example, such systems are often utilized on motor vehicles, such as axles and wheel ends. Typically, a lock nut will be engageable with a locking member or keeper which inhibits movement of the nut relative to the shaft. The locking member may include a protruding portion which extends into a slot or receiving portion of a shaft. The locking member may also engage the nut such that there is little or no movement between the nut and shaft.

It is important that teeth of a locking member engage teeth of the lock nut such that the locking member is positioned to allow it to engage a slot of the shaft. The nut must be aligned to allow such engagement by selective rotation of the nut to a particular position such that the teeth of the nut and the teeth of the locking member when engaged allow an engaging portion of the locking member to engage a slot of the shaft. Rotation of the nut may be performed during the preloading of a bearing and the degree of rotation allowed may depend on the amount of compressive force applied to a bearing or hub during the preloading of the bearing and the method of application of such force.

Thus, a need exists for providing accurate and repeatable procedures and devices for providing and adjusting bearing preload and for adjusting lock nut systems configured to retain preloaded bearings.

SUMMARY OF THE INVENTION

The present provides, in a first aspect, an apparatus for providing a load on a bearing mounted to a shaft which includes an attaching member and a press mechanism. The attaching member is releasably connectable to the shaft. The press mechanism is coupled to the attaching member and is configured to provide a compressive load to the bearing. The press mechanism includes an aligning arm configured to engage a shaft slot of the shaft to align the press mechanism relative to the shaft when the attaching member connects to the shaft.

The present invention provides, in a second aspect, a system for use in positioning a lock nut and providing a load on a bearing mounted to a shaft, which includes a preload apparatus and a lock nut. The preload apparatus is configured to provide a compressive load to the bearing and is releasably connectable to the shaft. The preload apparatus includes an aligning arm configured to engage a slot of the shaft to align the preload apparatus relative to the shaft when the preload apparatus connects to the shaft. The lock nut is engageable with the shaft and has a plurality of engaging teeth configured to engage a plurality of keeper teeth of a keeper. The keeper has a radially inner side configured to engage a shaft slot of the shaft to inhibit rotational movement of the nut relative to the shaft when the plurality of engaging teeth engages the plurality of keeper teeth and the radially inner side engages the shaft. The nut includes an outer surface having a plurality of markings corresponding to a plurality of roots of the plurality of engaging teeth to allow a user to selectively rotate the nut relative to the aligning arm to an engaging position to allow engagement of the plurality of engaging teeth with the plurality of keeper teeth when the preload apparatus is released from the shaft such that the radially inner side engages the slot of the shaft.

The present invention provides, in a third aspect, a method for providing a load on bearing mounted to a shaft which includes mounting an attaching mechanism to an end of the shaft and coupling a press mechanism to the attaching member. The press mechanism is configured to provide a compressive load to the bearing. An aligning arm of the press mechanism is engaged with a shaft slot of the shaft to align the press mechanism relative to the shaft.

BRIEF DESCRIPTION OF THE DRAWINGS

The subject matter, which is regarded as the invention, is particularly pointed out and distinctly claimed in the claims at the conclusion of the specification. The foregoing and other objects, features, and advantages of the invention will be readily understood from the following detailed description of aspects of the invention taken in conjunction with the accompanying drawings in which:

DETAILED DESCRIPTION OF THE INVENTION

Figure 1:
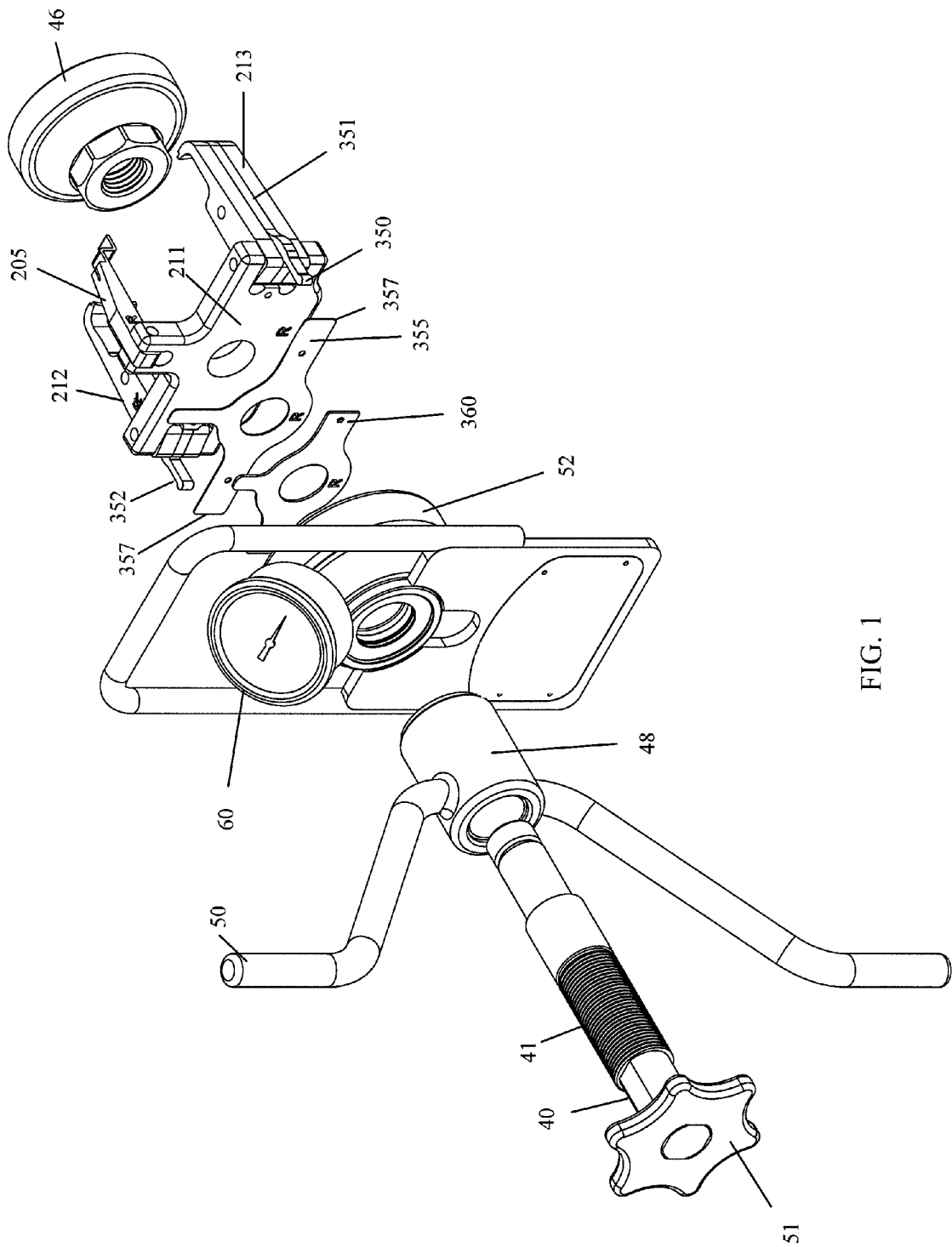
FIG. 1 is perspective exploded view, of a wheel hub assembly engaging a bearing preload apparatus according to one aspect of the invention.

In accordance with the principals of the present invention, system and methods for adjusting bearings mounted on a shaft and aligning lock nuts for retaining such bearings are provided.

In an exemplary embodiment depicted in FIG. 1-4, a wheel hub assembly 10 engages a bearing preload apparatus 20. Some of a section of the hardware has been removed to reveal inner structure to facilitate disclosure of the invention. For the sake of illustration, the wheel assembly that would typically be mounted to wheel hub assembly 10 is omitted in these figures.

Wheel hub assembly 10 is an assembly that would typically be found on a front or rear axle of a cab or tractor of a tractor-trailer, or an axle of a trailer. However, aspects of the invention are not limited to use for vehicle bearings. As will generally be understood by those skilled in the art, aspects of the invention may be used to service bearings and bearing assemblies in any machine or device that employs bearings, including, but not limited to: power trains, transmissions, machine components, on and off-road vehicles, aircraft wheels, marine drives, spacecraft, conveyor rolls, and windmills, among others. According to aspects of the present invention, preload apparatus 20 may be used in these and any other assembly for which bearing preload and/or endplay is desired, for example, any assembly that utilizes thrust and radial load carrying bearings that are indirectly mounted.

As shown in FIGS. 1-4, for example, wheel hub assembly 10 includes a wheel hub or, simply, a hub 12, a threaded shaft, axle, or spindle 14. As is typical, spindle 14 is mounted on two antifriction bearings and spindle 14 includes an exposed end 13, which is typically threaded. Spindle 14 typically includes a retaining nut 11 threaded to exposed end 13.

Figure 2:
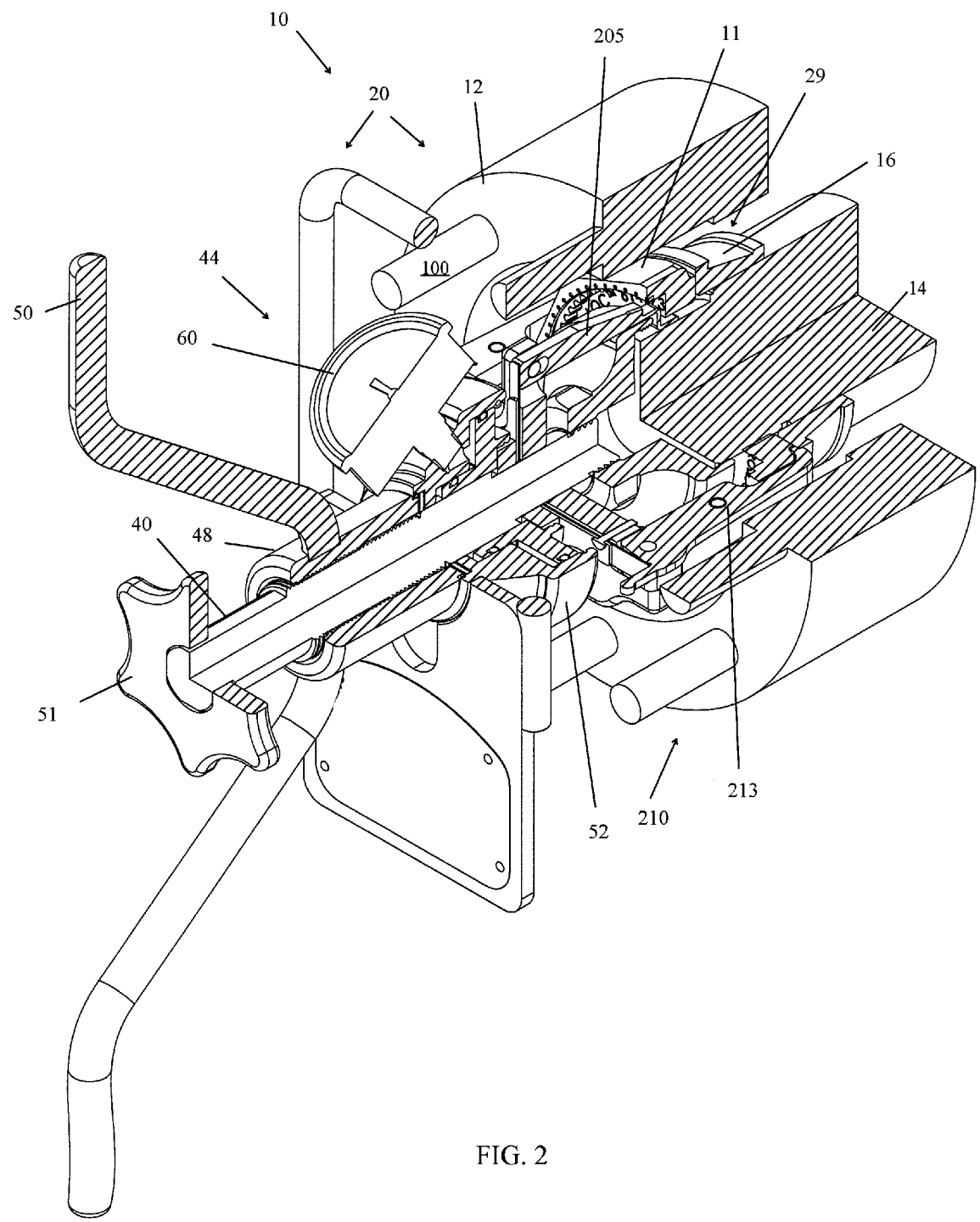
FIG. 2 is a perspective view, partially in cross-section, of the assembly shown in FIG. 1.
Figure 3:
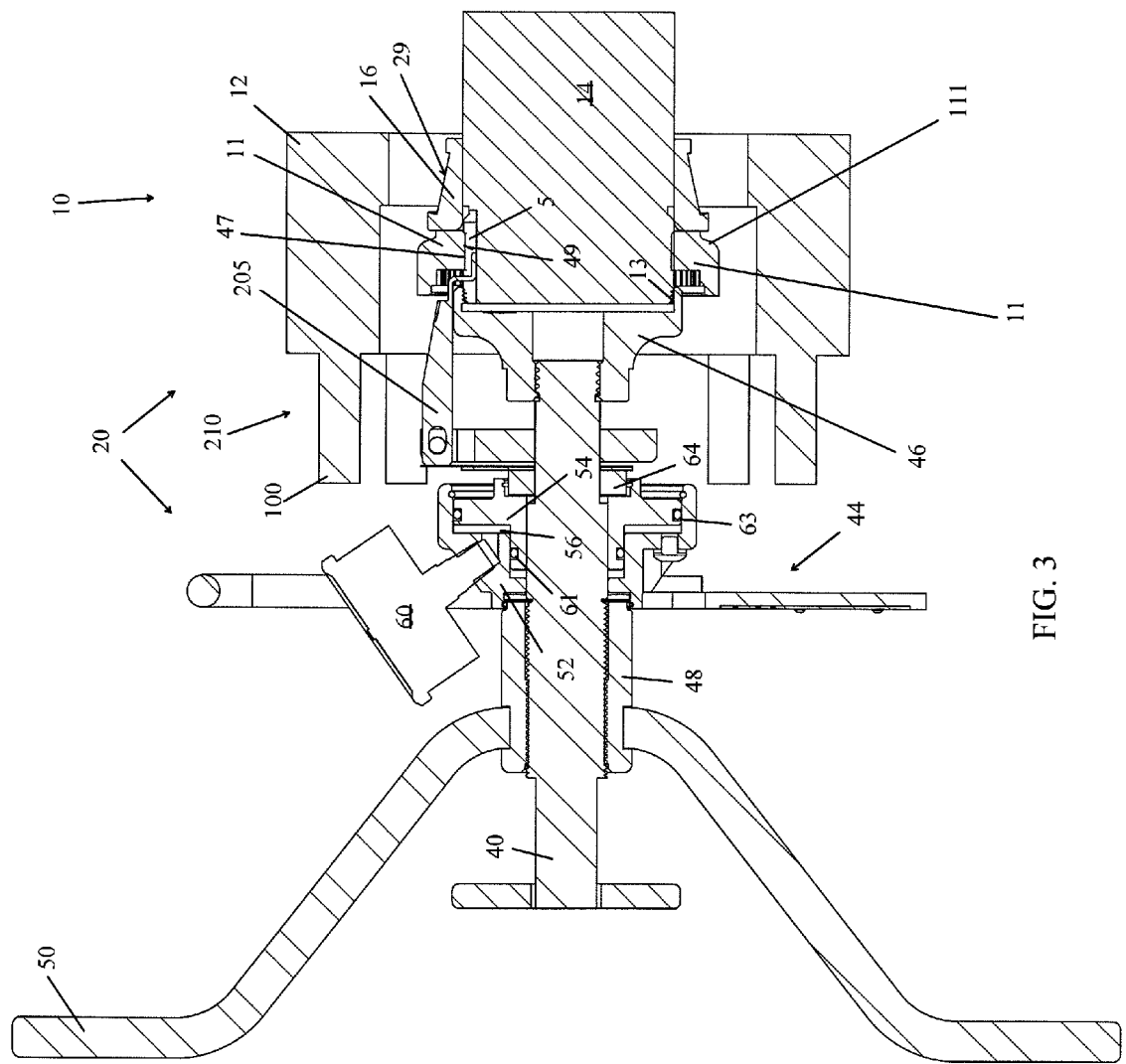
FIG. 3 is a right side elevation view, partially in cross section, of the assembly shown in FIG. 1.

As shown in FIGS. 1-3, as is typical of bearings, outboard bearing 16 includes an inner race (or cone) (not shown), an outer race (or cup) (not shown), a plurality of rollers (not shown), and a roller cage (not shown). Similarly, an inboard bearing (not shown) includes an inner race (or cone) (not shown), an outer race (or cup) (not shown), a plurality of rollers (not shown), and roller cage (not shown). As shown in FIG. 3, outboard bearing 16 is positioned, for example, by an interference fit, into an annular cavity 29. The details of an inboard bearing and an outboard bearing are described and depicted in co-owned U.S. Pat. No. 7,303,367, issued Dec. 4, 2007 (application Ser. No. 11/029,531 filed Jan. 5, 2005), entitled "Lock Nut System"; U.S. Publication No. 2007/0177829A1, published Aug. 2, 2007, (application Ser. No. 11/341,948 filed Jan. 27, 2006), entitled "Method and Apparatus for Preloading a Bearing"; and U.S. Pat. No. 7,389,579, issued Jun. 24, 2008 (application Ser. No. 11/354,513, filed Feb. 15, 2006), entitled "Method, Apparatus, and Nut for Preloading a Bearing", the entirety of which are incorporated herein by reference.

Figure 5:
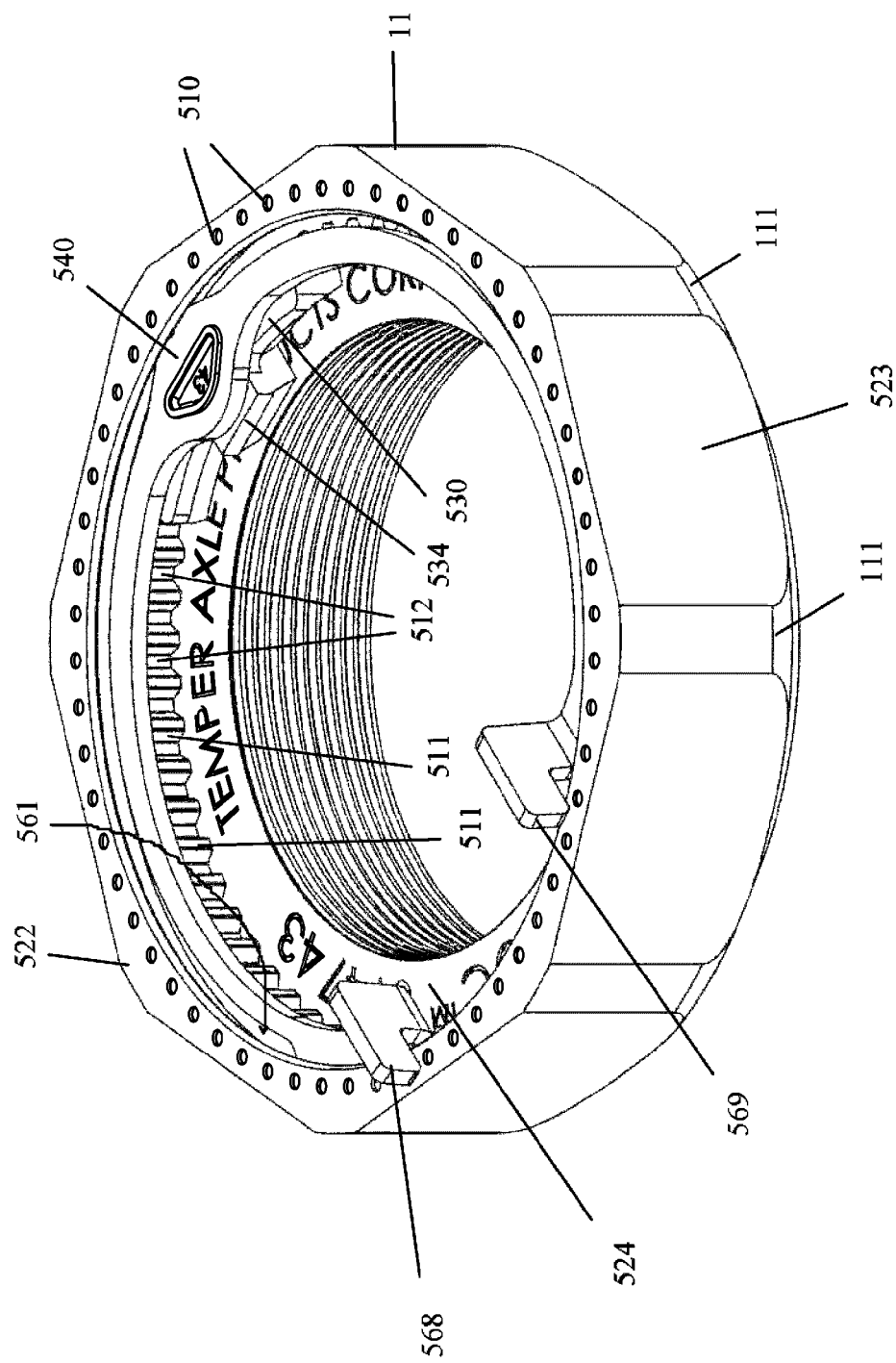
FIG. 5 is a perspective view of a lock nut system which includes a lock nut having a keeper and a keeper retaining member engaged with the nut according to an aspect of the present invention.
Figure 6:
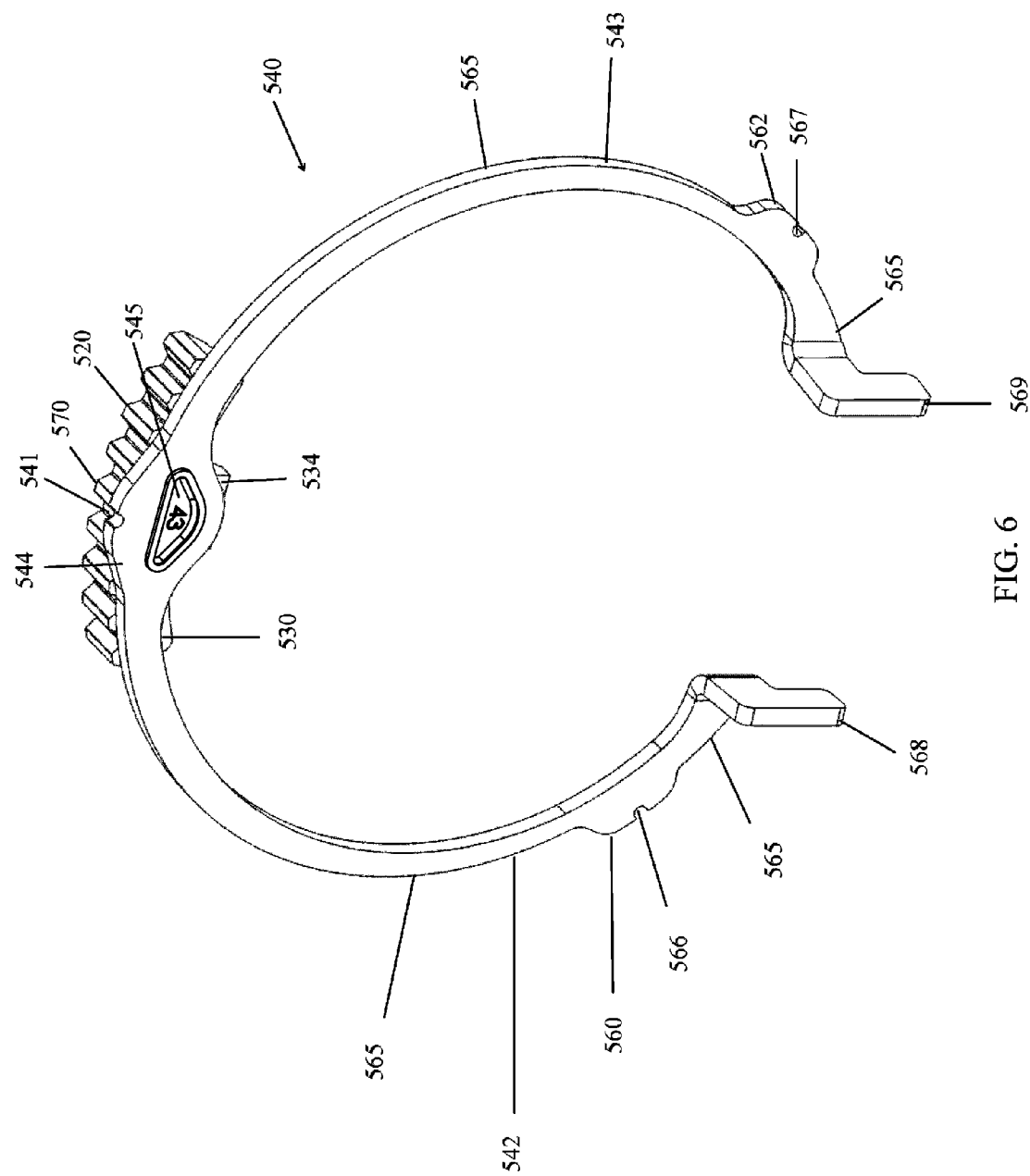
FIG. 6 is a perspective view of the keeper and keeper retaining member of FIG. 5.
Figure 7:
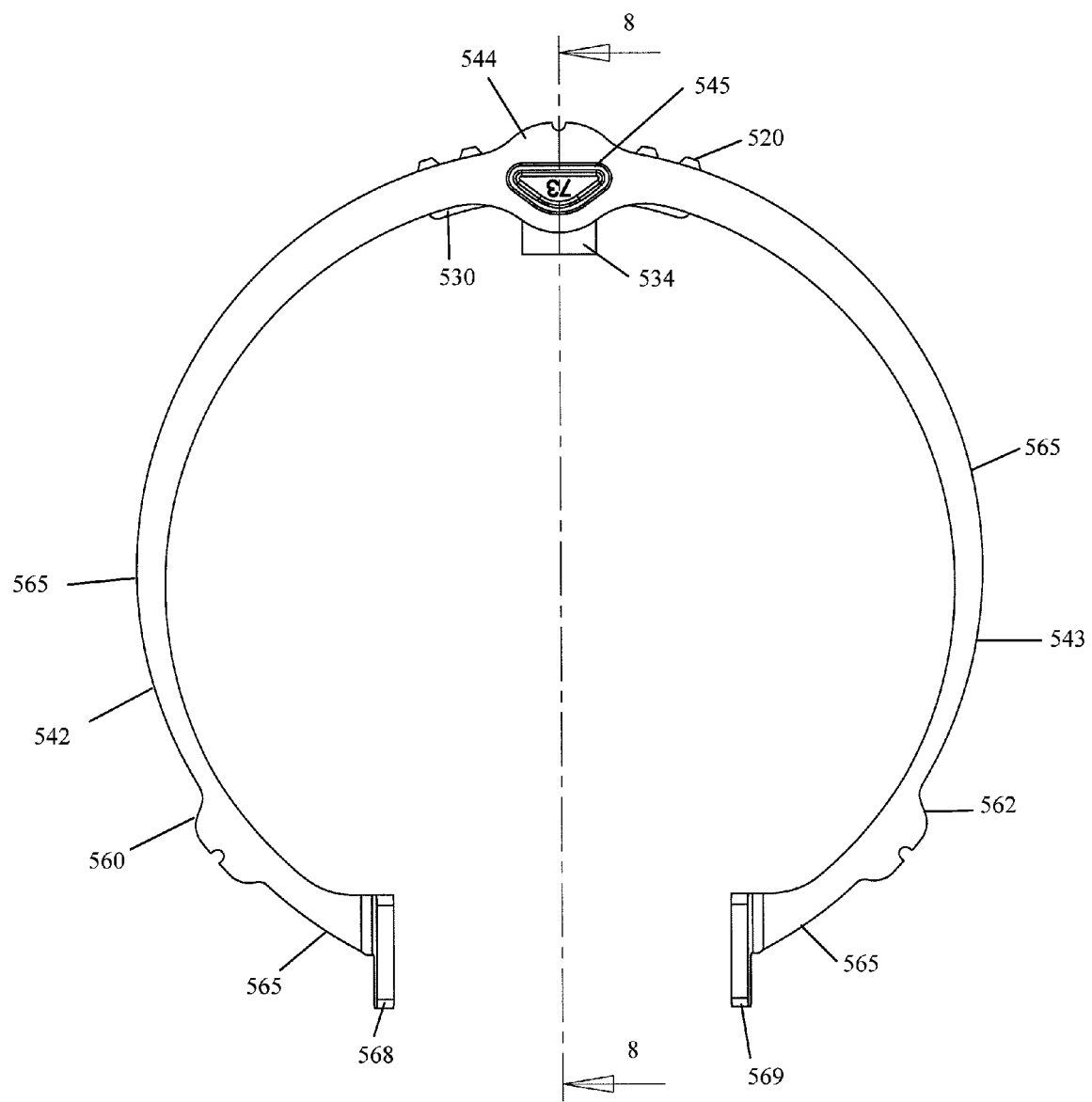
FIG. 7 is a side cross-sectional view of a keeper connected with a keeper retaining member of FIG. 5.
Figure 8:
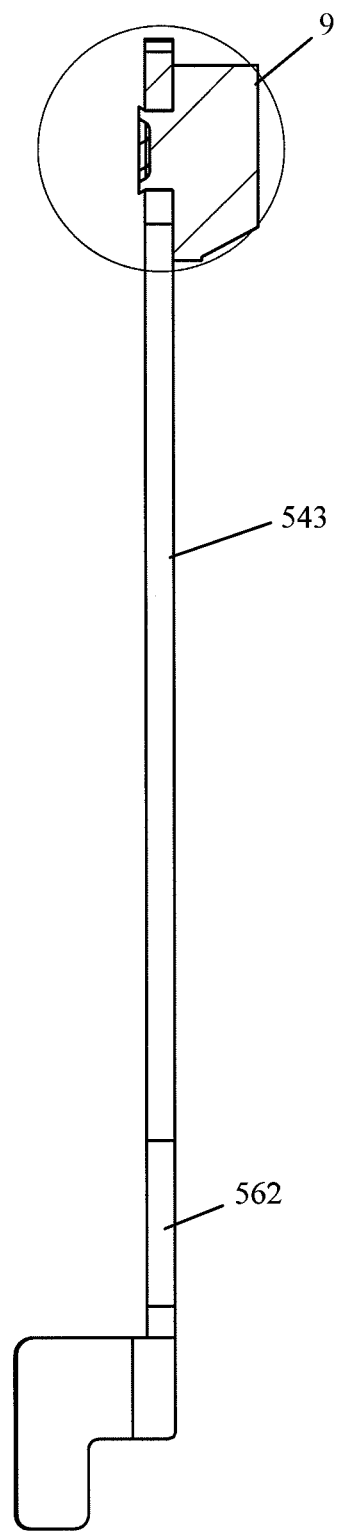
FIG. 8 is a side cross-sectional view of the keeper retaining member of FIG. 7 taken along lines 8-8.

As depicted in FIGS. 3 and 5-6, for example, retaining nut 11 may be a locking nut as disclosed in co-owned U.S. Pat. No. 7,303,367 (application Ser. No. 11/029,531 filed Jan. 5, 2005), entitled "Lock Nut System"; U.S. Publication No. 2007/0177829A1 (application Ser. No. 11/341,948 filed Jan. 27, 2006), entitled "Method and Apparatus for Preloading a Bearing"; and U.S. Pat. No. 7,389,579 (application Ser. No. 11/354,513, filed Feb. 15, 2006), entitled "Method, Apparatus, and Nut for Preloading a Bearing". In the conventional art, retaining nut 11 typically is used to secure a wheel (not shown) or hub assembly to a non-rotating axle or spindle 14. However, in aspects of the present invention, retaining nut 11 may be useful in varying the preload and/or endplay of bearing 16. Though bearing 16 is illustrated as a tapered roller bearing, aspects of the invention may be applied to other types of antifriction bearings for which it is desirable to provide preload and/or endplay, for example, spherical roller bearings, deep groove ball bearings, and the like.

Figure 9:
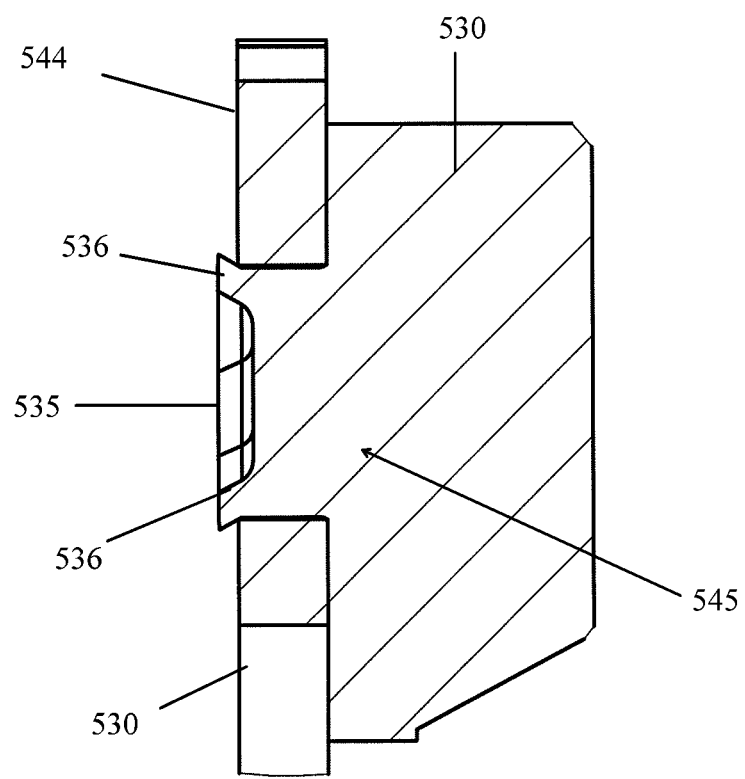
FIG. 9 is a close-up view of detail 9 of FIG. 8.

As depicted in FIGS. 5-9, a keeper 530 is engageable with retaining nut 11 and is connected to a keeper retaining member 540. A projection 535 of keeper 530 extends through an opening 545 in retaining member 540 when connected. Projection 535 extends substantially perpendicular to a plane of retaining member 540. Projection 535 may be deformed by pressure applied on a top thereof (i.e. in a direction substantially perpendicular to the plane of retaining member 540) to connect retaining member 540 with keeper 530 similar to the way a rivet is utilized, as will be understood by those skilled in the art. For example, as best depicted in FIG. 9, the deformation of projection 535 may cause edges 536 of projection 535 to extend over a top surface of keeper 530 thereby connecting projection 535 and keeper 530 to retaining member 540.

Keeper 530 and retaining member 540 engage retaining nut 11. For example, keeper 530 includes keeper teeth 520 which are configured to engage engaging teeth 511 of retaining nut 11. Keeper 530 may also include an engaging member 534 which protrudes radially inwardly relative to retaining nut 11 to engage a shaft slot 5 (FIG. 3), keyway, groove or other engaging portion of a shaft (e.g., spindle 14). Thus, engaging member 534 may inhibit movement of keeper 530 relative to a shaft (e.g., spindle 14) and the engagement of engaging teeth 511 with keeper teeth 520 may inhibit movement of keeper 530 relative to retaining nut 11. Accordingly, movement of retaining nut 11 relative to the shaft is prevented or reduced. Keeper 530 and/or nut 11 may be molded or formed of powdered metal, for example.

Keeper retaining member 540 may engage a slot 561 of retaining nut 11. For example, a first leg 542 and a second leg 543 may be received in slot 561. For example, slot 561 may have a radial depth of about 0.050 inches. Further, a nose 544 of retaining member 540 may be received in slot 561. Retaining member 540 when received in slot 561 may align keeper 530 such that keeper teeth 532 are engaged with engaging teeth 511. Further, retaining member 540 provides resistance in an axial direction relative to retaining nut 11 thereby inhibiting movement of keeper 530 axially away from a shoulder 524 toward an outer surface 522.

Retaining member 540 may be elastically deformable to allow it to be received in slot 561. For example, first leg 542 and second leg 543 may be deformed (e.g., in a direction substantially perpendicular to the axis of retaining nut 11) toward one another prior to being inserted axially past outer surface 522 of retaining nut 11 to allow retaining member 540, and keeper 530 to be attached thereto. First leg 542 and second leg 543 may then be elastically returned toward slot 561. First leg 542 may also include a gripping member 568 and second leg 543 may include a second gripping member 569. The gripping members are substantially parallel to one another and are aligned at about 90 degrees from a plane of retaining member 540. A user may grip the gripping members and move them towards one another as described above to allow the retaining member to be received in slot 561. The gripping members may be monolithically formed relative to the remainder of retaining member 540 or they may be attached thereto via welding or other means of fastening.

Also, first leg 542 may include a protruding portion 560 which protrudes radially relative to a rounded portion 565 of retaining member 540. Similarly, second leg 543 may include a protruding portion 562. Protruding portion 560 and protruding portion 565 may extend into slot 561 to engage retaining member 540 with slot 561. Further, protruding portion 560 may include a groove 566 and protruding portion 562 may include a groove 567. For example, retaining member 540 may be formed of stamped sheet metal, and may have a thickness in a range between 0.040-0.050 inches, as will be understood by those skilled in the art. Alternatively, retaining member 540 could be formed of other materials (e.g., powdered metal) and/or formed in other shapes to allow retaining member 540 to be received in slot 561 and to be connected to keeper 540 via projection 535. Further, keeper 530 may be formed or molded of powdered metal, for example. Alternatively, keeper 530 and retaining member 540 could be formed integral or monolithic relative to one another.

Further, keeper 530 and/or nut 11 may be fabricated from any one or more of the structural metals, for example, carbon steel or stainless steel. Nut 11 may be fabricated by machining from a billet or plate, by forging or casting and then finished machining, or fabricated by conventional powder metallurgy techniques. In one aspect, when formed by powder metallurgy, the material may be FC 0208, or its equivalent. Nut 11 may also be surface hardened for example, induction hardened, carburized, or nitrided, among other surface hardening methods; in one aspect, the exposed surfaces on end 241 of nut 220 may be hardened, for example, induction hardened.

Returning to FIGS. 1-4, preload apparatus 20 includes an attaching mechanism, such as a shaft or rod 40 engageable with spindle 14 by a collar 46, and a press mechanism 44 for providing a compressive load to bearing 16. In addition, aspects of the invention provide means for monitoring the preload on the bearings to, for example, ensure that the desired preload is provided, in contrast to the unreliable and often inaccurate assumed preloading of the prior art.

Rod 40 may be configured to attach to exposed end 13 of shaft 14, for example, by collar 46, though other attachment means may be used. Press mechanism 44 may include an adjustment nut 48 which may be threaded to rod 40 (e.g., on external threads 41 (FIG. 1)) to mount press mechanism 44 to rod 40 and may provide a compressive load to press mechanism 44. Nut 48 may be adapted to facilitate rotation of nut 48, for example, nut 48 may include arms 50 and/or a hand wheel 51 that can assist a mechanic while manually tightening or untightening nut 48. In one aspect, nut 48 may be adapted to be rotated by an automated tool, for example, a drill or stepper motor (not shown). For example, nut 48 may be fashioned with a hex head or threads to engage an automated tool, for example, a torque motor (not shown).

Figure 4:
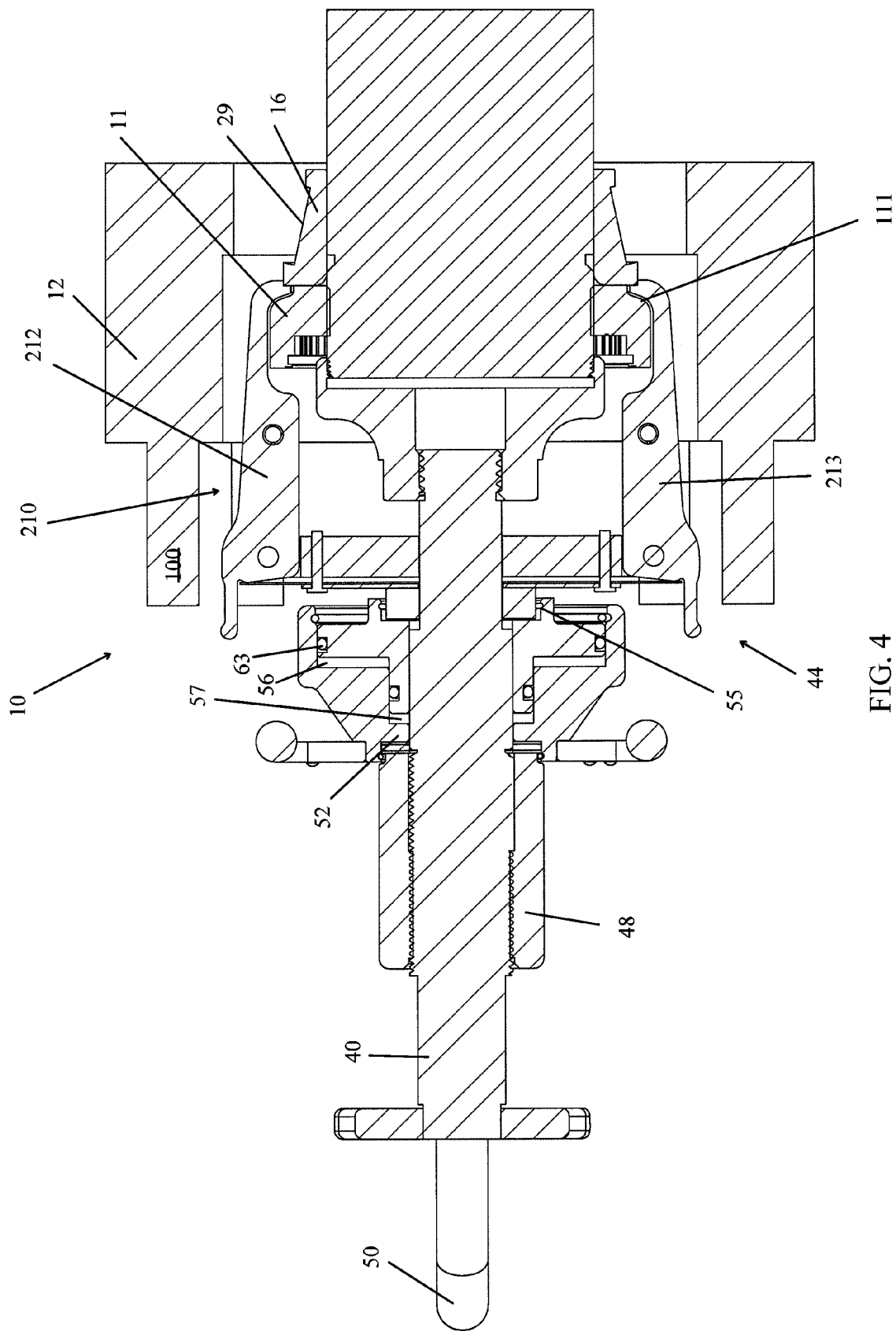
FIG. 4 is a bottom plan view, partially in cross section of the assembly shown in FIG. 1.

As shown in FIGS. 1-4 and 10-11, press mechanism 44 includes a loading adapter 210. A compressive load from press mechanism 44 (e.g., from nut 48 thereof) is transmitted to bearing 16, and to bearing 18, by loading adapter 210. Further, loading adapter 210 works in conjunction with retaining nut 11 to provide a load to outboard bearing 16 (e.g., an inner race (not shown) thereof). Retaining nut 11 may have a recess that exposes the surface of inner race 15 and permits contact by, for example, loading adapter 210. For example, as depicted in FIGS. 3-5, nut 11 may have a bottom curve or recessed portion 111 such that a bottom end of nut 11 has a smaller diameter than the remainder thereof. Loading adapter 210 may thus transmit the compressive load from press mechanism 44 (i.e., around nut 11) to bearing 16. In an unillustrated example, bearing 16 could be exposed thereby allowing load adapter 210 to be used with a conventional axle nut, as shown for example in FIG. 3 of co-owned application, U.S. Pat. No. 7,389,579 issued Jun. 24, 2008 (application Ser. No. 11/354,513, filed Feb. 15, 2006), and entitled "Method, Apparatus, And Nut For Preloading A Bearing". However, when bearing 16 would be concealed by such a conventional axle nut, retaining nut 11 may be used instead thereof according to aspects of the invention.

Figure 10:
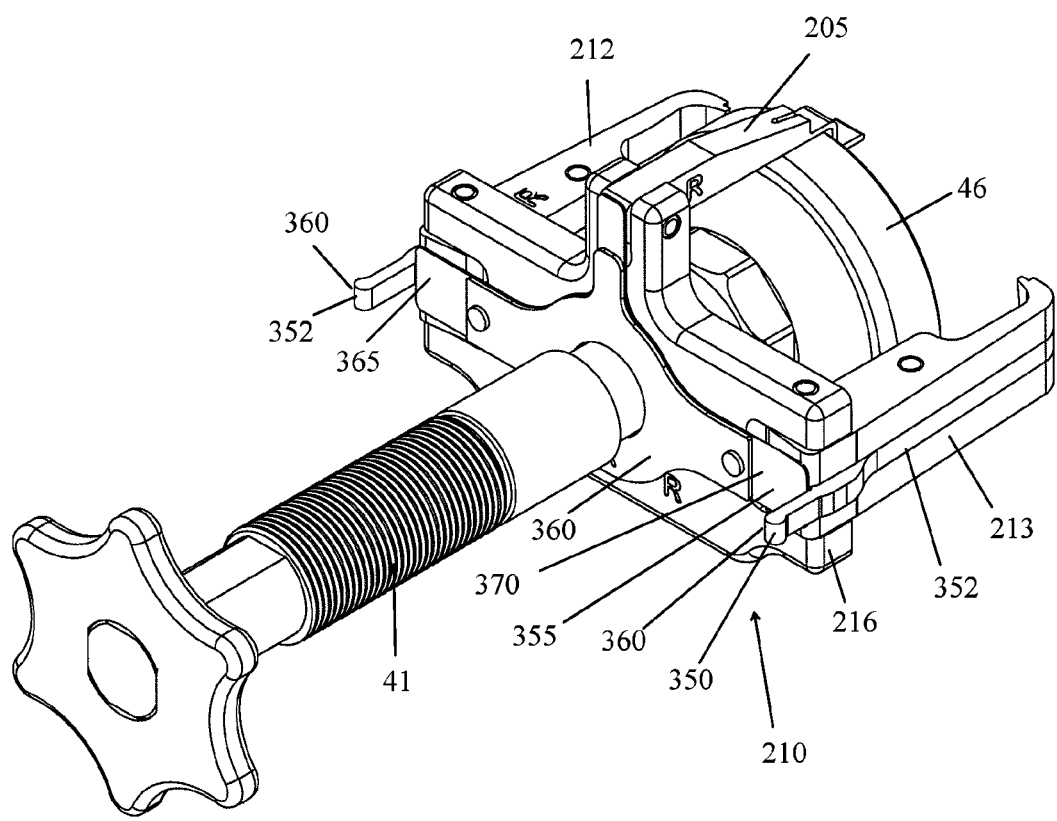
FIG. 10 is a left end perspective view of the bearing loading adapter shown in the assembly of FIGS. 1-4.
Figure 11:
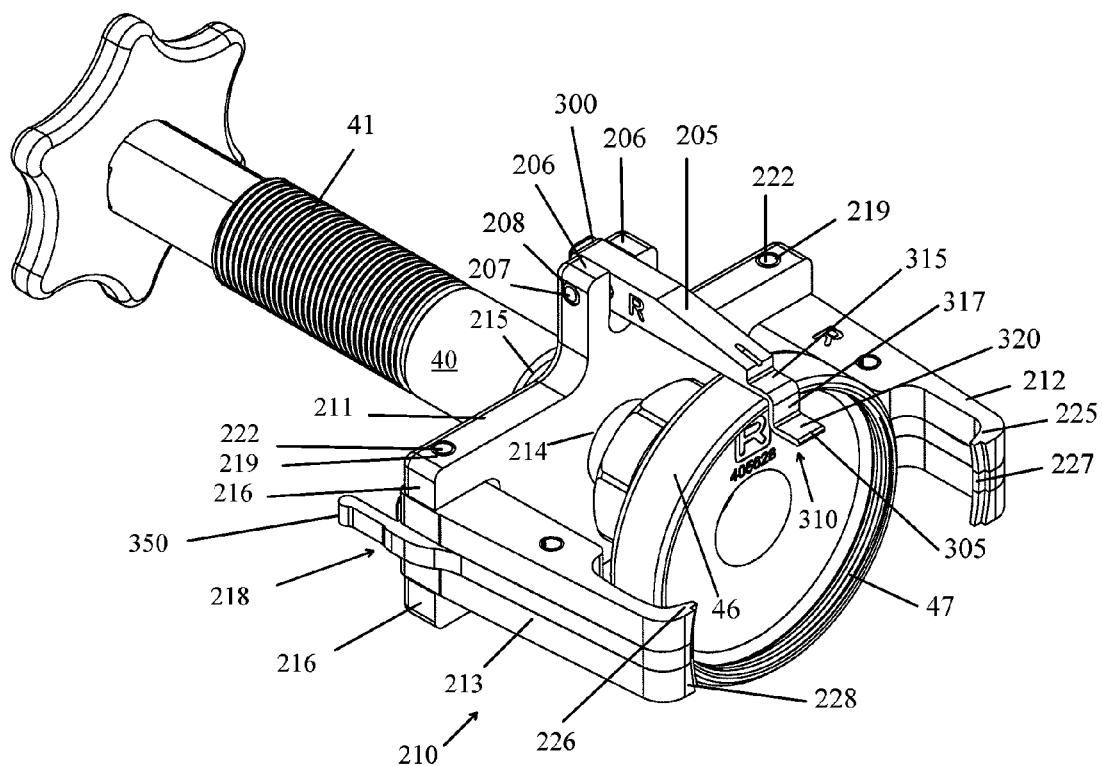
FIG. 11 is a right end perspective view of the bearing loading adapter shown in the assembly of FIGS. 1-4.
Figure 12:
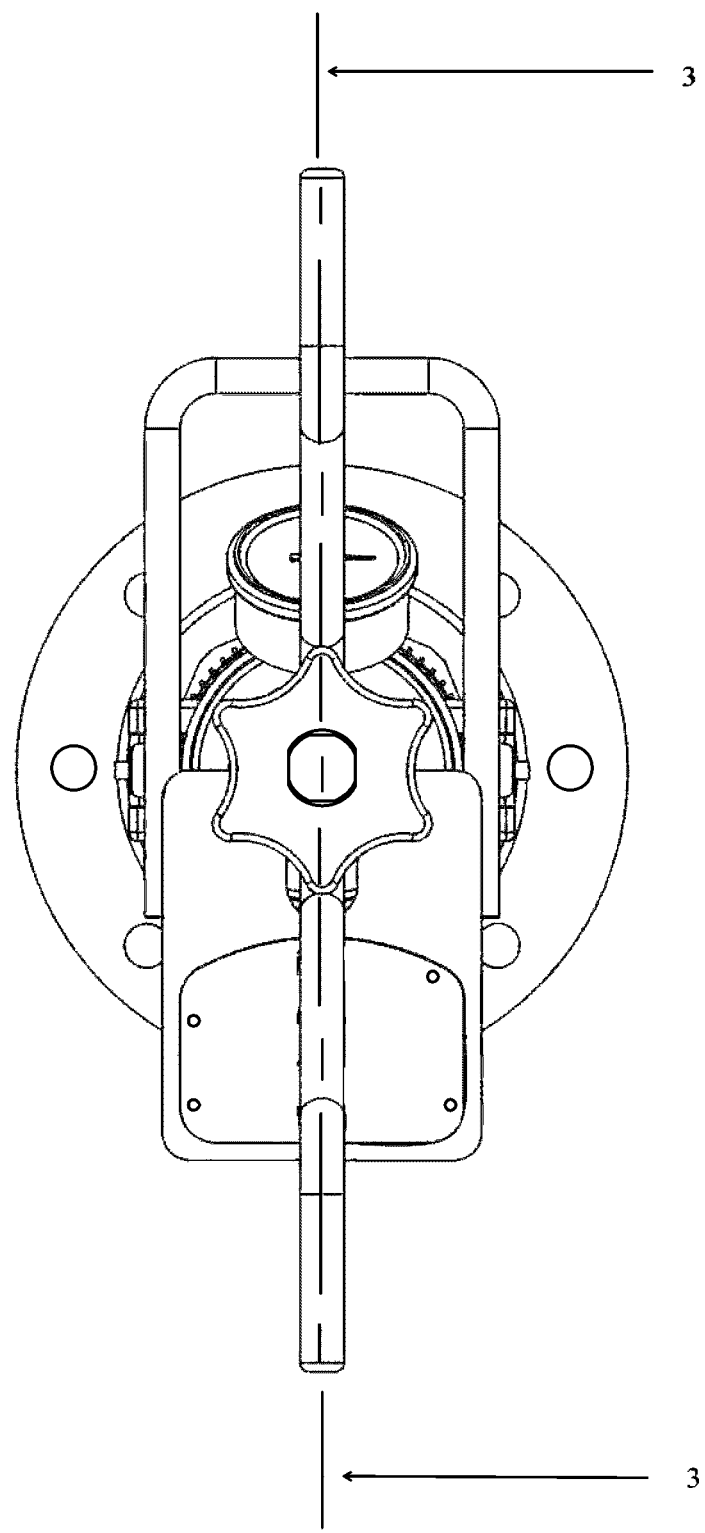
FIG. 12 is a side view of the assembly of FIGS. 1-4.

As depicted in FIGS. 10-11, loading adapter 210 includes a plate 211 and at least two extensions, fingers, or arms 212, 213 extending from plate 211. In this aspect of the invention, extensions 212 and 213 are adapted to transmit the load applied to plate 211, for example, by the compression of nut 48, to the bearing 16. Plate 211 typically includes a through hole or bore 214 that is adapted to receive rod 40. Plate 211 may also include a raised boss 215 adapted to contact press mechanism 44, for example, adapted to contact piston 54 or bearing 64 (FIG. 3). In one aspect, extensions 212 and 213 may be moveable or deflectable to facilitate assembly of adapter 210 into engagement with bearing 16. For example, extensions 212 and 213 may include any interface with plate 211 or modification to extensions 212 and 213 that permits extensions 212 and 213 to deflect to avoid interference with nut 11. Extensions 212 and 213 may be pivotally mounted to plate 211. Plate 211 may include two pairs of oppositely extending lugs or projections 216 having through holes 219, and projections 216 may include recesses 218 configured (e.g., shaped and dimensioned) to receive extensions 212 and 213. Pins 222 may be provided in holes 219 in projections 216 that engage holes (not shown) in extensions 212 and 213 whereby extensions 212, 213 may rotate about pins 222.

Arms or extensions 212, 213 may include projections 225, 226, respectively, for example, arcuate projections adapted to engage the arcuate shape of bearing 16 (e.g., an inner race thereof). Arcuate projections 225, 226 may be radiused to provide the same curvature of bearing 16, for example, a radius of between about 1¼ inches and about 3 inches. Projections 225, 226 may include shoulders 227, 228, respectively, to assist in engaging bearing 16. In one aspect, since pins 222 (which transmit the load from plate 211 to extensions 212, 213) may be located at a greater radial distance from the center of shaft 14 than the radial distance to the point of contact on bearing 16 (see FIG. 4), shoulders 227, 228 may be provided to minimize or prevent contact of projections 225, 226 with nut 11. This aspect of the invention may ensure that the compressive load applied by press mechanism 44 is transmitted to bearing 16 and not borne by nut 11. Minimizing or preventing contact between extensions 212, 213 and nut 11 also permits nut 11 to be freely rotated without contact with extensions 212, 213.

Loading adapter 210 may also include an aligning arm 205 configured (e.g., shaped and dimensioned) to engage shaft slot 5 (FIG. 3) of spindle 14, for example, as depicted in FIGS. 1-4 and 10-11. Aligning arm 205 may be pivotally connected to a connecting member 206 of plate 211. A pin 207 may be received in openings 208 in connecting member 206 to connect arm 205 to opposing portions of connecting member 206. Aligning arm 205 may be utilized by a user as a reference point relative to retaining nut 11. In particular, retaining nut 11 may include one or more markings 510 corresponding to one or more roots 512 (i.e., low points equidistant between each pair of engaging teeth) of engaging teeth 511 thereof as depicted in FIG. 5. For example, the markings may be circular indentations in the nut. The location of such markings on outside surface 522 of nut 11 allows a user to selectively rotate the nut relative to aligning arm 205 (e.g., when pressure is applied to bearing 16 by press mechanism 44 to allow rotation of nut 11) to an engaging position where the arm is at a desired position relative to one or more of markings 510. In such position, engaging teeth 511 may be properly engaged with keeper teeth 520 such that radially inner side 534 engages shaft slot 5 of spindle 14, i.e., after preload apparatus is removed and keeper 530 and keeper retaining member 540 engage nut 11. Further, keeper retaining member 540 may include a notch 541 in a nose 544 thereof with the notch being located at about a geometrical central point of keeper retaining member 540 (e.g., on an axis of symmetry thereof) such that an equal amount of retaining member 540, such as first leg 542, is one side thereof while the remainder of retaining member 540, such as second leg 543, is on another side thereof. Further, keeper 530 may be centered on keeper retaining member 540 such that a central engaging tooth 570 is aligned with notches 541. Also, retaining member 540 may be placed in slot 561 such that engaging tooth 570 engages a tooth root aligned with a marking of markings 510 to which notch 541 is aligned. Alternatively, markings 510 could correspond to a different feature of nut 11 (i.e., besides the roots between teeth 511) to facilitate the engagement of nut 11 with keeper 530 and/or keeper 530 with shaft slot 5 of spindle 14.

As depicted in FIGS. 3 and 10-11, for example, aligning arm 205 may decrease in size (e.g., a thickness or height dimension in a radial direction relative to rod 40) from connecting end 300 to engaging end 305. Further, aligning arm 205 may include a stepped portion 310 having a first step 315 and a second step 320 wherein second step 320 engages slot 5. The shape of the stepped portion 310 allows aligning arm 205 to extend axially on step portions 315 and 320 and radially on a radial portion 317. Such shape allows aligning arm 205 to extend past collar 46, extend toward retaining nut 11 axially in step portion 315, extend radially into slot 5 in radial portion 317 and extend axially within slot 5 in step portion 320. Thus, the shape of aligning arm 205 allows it to extend through nut 11 into slot 5. Such engaging of aligning arm 205 with slot 5 allows the alignment of markings 510 with the aligning arm as described above. Further, aligning arm 205 may be formed in any shape which allows the aligning arm to engage slot 5 while allowing rotation of retaining nut 11 such that markings 510 may be positioned relative to aligning arm 205 as desired.

Although only two extensions 212, 213 are illustrated in FIGS. 3 and 10-11, according to one aspect of the invention, two or more extensions 212, 213 may be mounted to plate 211. For example, three or more extension 212, 213 may be provided, for example, uniformly spaced about plate 211. In one aspect, plate 211 may be a circular plate having two or more extensions 212, 213.

In one aspect of the invention, extensions 212, 213 may include spring-loaded mountings to plate 211 whereby extensions 212, 213 are biased into a position of engagement with race 15. As depicted in FIGS. 1 and 10-11, a biasing member 350 is received in a slot 351 of arm 213. Similarly, a biasing member 352 is received in a slot (not shown) of arm 212. A semi-flexible plate 355 is received between a rigid plate 360 and plate 211. Opposite ends 357 of plate 355 engage biasing members 350 and 352 such that arms 212 and 213 are biased in the position depicted in FIGS. 1, 10 and 11, i.e., substantially perpendicular to plate 211. Arms 212 and 213 may be rotated away from one another by a user moving ends 360 of biasing members 350 and 352 toward one another. The semi-flexible nature of plate 355 allows a first portion 365 and second portion 370 thereof located between plate 360 and the biasing arms to flex or bend thereby allowing the rotation of ends 360 toward one another and therefore projections 225 and 226 away from one another. This movement allows arms 212, 213 to move around outer surface 522 and sidewall 523 of nut 11 and into recess or curved portion 111 thereof. Also, aligning arm 205 may similarly include spring-loaded mountings to plate 211 such that arm 205 is biased into a position extending from plate 211 in a same direction as extensions 212, 213 and toward shaft slot 5 when preload apparatus is engaged with hub assembly 10. Further, multiple aligning arms (e.g., similar or identical to arm 205) may be connected to plate 211 in the event of multiple shaft slots on the shaft utilized (e.g., spindle 14). Adapter 210 and its components may be fabricated from any conventional structural metal, for example, iron, steel, stainless steel, aluminum, titanium, nickel, magnesium, brass, or bronze, among others.

Press mechanism 44 may be any means that is configured to provide a compressive load (e.g., utilizing nut 48) to outboard bearing 16 (e.g., an inner race thereof). Further, press mechanism 44 may include a load sensor or any means for monitoring the compressive load transferred to bearing 16. For example, the indication of the compressive load transferred by press mechanism 44 may be provided mechanically, for example, by compression springs having a known spring constant, for example, coil springs or disc springs, and a deflection indicator, for example, a dial indicator, as is known in the art. In this aspect, the dial indicator may be mounted to detect and indicate the compression of one or more springs positioned in press mechanism 44 due to the advancement of nut 48, and the compression load calculated from the deflection indicated and the known spring constant of the springs used. This aspect of the invention may provide a reliable and repeatable means for monitoring the preload provided to inner race 15 of outboard bearing 16. The load sensor may be wired to an appropriate processor and display to, for example, provide a digital readout of the compressive load to the mechanic operating preload device 20. The transmission of signals from the sensor may also be practiced wirelessly, for example, by means of an RF signal. This aspect of the invention may also provide a reliable and repeatable means for monitoring the preload provided to bearing 16.

As depicted in FIGS. 1-4, for example, press mechanism 44 includes a housing 52 and a movable piston 54 mounted for axial movement in housing 52. In this aspect of the invention, an internal cavity 56 is provided in housing 52 between the between housing 52 and piston 54, for example, an annular cavity. Internal cavity 56 is at least partially filled, for example, substantially completely filled, with a fluid, for example, a gas, air, oil, water, and the like, that produces a hydrostatic pressure, P, when housing 52 is compressed by the advancement of nut 48 on rod 40. Piston 54 may be provided with one or more seals 61 and 63, for example, one or more wiper seals, to minimize or prevent the leakage of fluid from cavity 56. Also, housing 42 may include an internal cavity 57, which provides clearance for the displacement of piston 54 within housing 52. In one aspect, a leakage path through housing 52 may be provided from cavity 57 to minimize or prevent buildup of fluid in cavity 57 which may interfere with the proper operation of piston 54. Piston 54 may also be retained in housing 52 by means of a retainer or snap ring 55. Housing 52 and piston 54 may be fabricated by machining from solid bar or plate stock, welded from bar or plate, forged, or cast.

As shown in FIGS. 2-3, the compressive load applied by the advancement of nut 48 is transmitted to housing 52, to the fluid in cavity 56, to piston 54, to cylindrical housing 42, to hub 12, and ultimately to the outer race 21 of bearing 18. Thus, according to aspects of the invention, the hydrostatic pressure induced in the fluid in the cavity 56 by the advancement of nut 48 provides a direct indication of the preload on bearing 18.

In one aspect, the pressure P in cavity 56 may be monitored, for example, continuously, by means of a pressure sensor or pressure gage. As shown in FIGS. 2-3, pressure P in cavity 56 may be monitored by one or more pressure indicators 60 which is adapted to detect the pressure P in cavity 56 via a passage 58 in housing 52. Pressure indicator 60 may be an analog or digital pressure gage. Pressure indicator 60 may be a pressure sensor adapted to detect the pressure P in cavity 56 and forward an electrical signal corresponding to the pressure P to a processor or controller adapted to display the pressure, record the pressure, energize a circuit in response to the pressure, and/or provide a signal to the mechanic, for example, a tone or bell that a pressure corresponding to a desired preload on bearing 16 has been achieved.

According to aspects of the invention, the pressure P and the corresponding geometry (for example, the inside and outside diameters of cavity 56) may be used by a mechanic to determine the preload on bearing 16. For example, for a desired preload L (in pounds, Newtons) and a given area of piston 54 exposed to pressure P (in square inches, square meters), the desired pressure of the fluid in cavity 56 may be determined by the equation P=L/A, for example, in psi or Pascal. For example, when a preload of 6000 pounds lbs. (L) is desired to provide an compressive deflection of 0.003 inches on bearing 16, and the outside diameter of annular cavity 56 is 3 inches and the inside diameter of cavity 56 is 1 inch, the target pressure, P, is calculated by $$P=L/A=(6000 \text{ lbs})/((\pi/4)(3^2-1^2))=6000 \text{ lbs}/(2\pi \text{in}^2)$$
$$=955 \text{ psig.} \quad \text{Equation 1}$$

This pressure may now be used as the target pressure in cavity 56 and detected by pressure indicator 60 to provide the desired 0.003-inch compressive deflection for bearing 16. According to aspects of the present invention, the pressure of the fluid in cavity 56 may be monitored to determine when the desired pressure P is achieved wherein the desired preload is provided to bearing 16.

In another aspect of the invention, press mechanism 44 may include at least one fluid, for example, a gas, such as air; or a liquid, such as, water, oil, or hydraulic fluid, the pressure of which can be detected and monitored, for example, by means of a pressure gage, pressure sensor, or a mechanical indicator. In one aspect not illustrated, the fluid pressure may comprise the source of compressive load on bearing 16. Such an apparatus would be similar to that depicted in FIG. 7 of co-owned U.S. Pat. No. 7,389,579 issued Jun. 24, 2008 (application Ser. No. 11/354,513, filed Feb. 15, 2006), except that loading adapter 210 is substituted for frame 42 depicted in FIG. 9 of the indicated patent application incorporated herein by reference. In such an embodiment, the fluid may be retained in a cavity for example, a deformable cavity, such as a bladder or hose, for example, an air spring; or a cavity having rigid walls and at least one moveable wall, for example, as in a cylinder and piston. In one aspect, the deformable cavity or air spring may be made of molded rubber, somewhat like an inner tube.

When air is used as the fluid, the air may be provided by conventional "shop air" at a pressure of about 100 psig. The pressure of the fluid in the deformable cavity may be monitored by means of sensor or pressure gage, for example, a pressure gauge mounted to a nozzle inserted the wall of the deformable or non-deformable cavity. In one aspect, a mechanical indicator may be activated, for example, a lever deflected when the desired fluid pressure in press mechanism 44 is reached advising the mechanic. One aspect of the invention having a press mechanism 44 utilizing a fluid is illustrated in FIGS. 1-3.

As discussed previously, rod 40 is adapted to attach to exposed end 13 of spindle 14. Though this may be effected by many conventional means, including welding and mechanical fasteners, in the aspect of the invention shown in FIGS. 1-4, rod 40 is attached to end 13 of spindle 14 by means of a collar 46. In the aspect shown, collar 46 is mounted to rod 40 by means of internal threads 47 in collar 46 that thread onto external threads 49 on rod 40. Collar 46 also includes a second set of internal threads 45 that engage external threads 51 on spindle 14. In one aspect, only 2 or 3 external threads 51 need be engaged by collar 46. According to one aspect, multiple collars 46 having varying diameters may be provided to accommodate varying diameters of spindle 14. Each of these collars 46 may be adapted to engage external threads 49 on rod 40.

Rod 40, housing 42, collar 46, nut 48, arms 50, housing 52, piston 54, and housing 42 may be fabricated from any conventional structural metal, for example, iron, steel, stainless steel, aluminum, titanium, nickel, magnesium, brass, or bronze, among others.

In one aspect of the invention, preload apparatus 20 may be used to apply and monitor a preload to outboard bearing 16. In a typical procedure, a wheel (not shown) may be dismounted from hub assembly 10, for example, which was mounted to studs on hub 10, as exemplified by stud 100 in FIGS. 1-4. Apparatus 20 may be prepared by assembly and filling cavity 56 with a fluid, for example, oil, through an access port (not shown) similar to that occupied by pressure indicator 60. Nut 11 may be loosened or hand tightened prior to mounting apparatus 20, though any light load on nut 11 will typically be relieved with application of tension to spindle 14 by means of rod 40. Apparatus 20 is then mounted to hub assembly 10 by attaching rod 40 to spindle 14 by means of collar 46. As a result, extensions 212, 213 are brought into contact with bearing 16 (e.g., an inner race thereof). Assuming a desired compressive deflection for bearing 16, for example, 0.003 inches, and a corresponding preload, L, the desired target pressure in cavity 56 can be calculated by Equation 1.

The loading of bearing 16 may be initiated by advancing, that, is tightening, nut 48, against housing 52 via bearing 62, for example, by means of arms 50. The build up of pressure in cavity 56 as indicated by pressure indicator 60 may be monitored by the mechanic. The tightening of nut 48 continues until the target pressure is achieved. The hub assembly may be rotated at least once to provide proper seating of the rollers in bearing 16. For example, nut 48 including arm 50 may be rotated three revolutions and such nut handle may then be counter-rotated slightly to arrive at a desired pressure as indicated on a pressure sensor (e.g., gauge 60). Once the target pressure is achieved in cavity 56, and the desired preload is applied to bearing 16, nut 11 may be tightened (e.g., by hand) against inner race 15 to maintain the preload after apparatus 20 is removed. The desired tightening of nut 11 may be determined by positioning one or more of markings 510 on nut 11 relative to aligning arm 205. Also, the hub assembly may be rotated at least once to provide proper seating of the rollers in bearing 16. Upon completion of the preloading, apparatus 20 may be removed from wheel hub assembly 10 and, keeper 530 and retaining member 540 may be engaged with retaining nut 11 and spindle 14 such that keeper teeth 520 engage teeth 511 of nut 11 and engaging member 534 of keeper 530 engage shaft slot 5 of spindle 14. As indicated above, nut 11 may be selectively rotated based on markings 510 and aligning arm 205 such that keeper teeth 520 and engaging teeth 511 engage one another and engaging member 534 engages shaft slot 5 in a manner to inhibit movement of spindle 14 relative to retaining nut 11. The wheel may then, for example, be remounted. Variations on this procedure while not deviating from the desired results may be apparent to those of skill in the art.

The preloading of the bearings as described above is advantageous relative to endplate adjustment but was rarely recommended prior to the present invention due to the difficulty of creating and verifying a correct preload site. The use of a load sensor such as a pressure indicator or gauge 60 along with the selective positioning of retaining nut 11 on spindle 14 (e.g., using arm 205 and markings 510) provide for a repeatable correct and accurate preload setting.

In another example, press mechanism 44 may apply pressure by fluid pressure to provide the compressive load to bearing 16. In this aspect of the invention (not shown) described above relative to co-owned U.S. Pat. No. 7,389,579 instead of the compressive force provided by the advancing of a nut (e.g., nut 48), the compressive force provided by the nut may be supplemented by or replaced by fluid pressure provided to cavity 56 in housing 52 having piston 54. In this aspect, the fluid pressure may be provided by a conduit or hose (not shown). The hose may supply fluid, for example, hydraulic fluid, from a pressurized supply, for example, a pump. The fluid supplied to the hose may vary from 500 to 3000 psig. In one aspect, the fluid pressure provided through the hose may be the only supply of compressive force to the bearing.

Such a press mechanism applying pressure by fluid pressure may be used to automatically regulate the compressive load on bearing 16, for example, by regulating the pressure introduced to press mechanism 44 through the hose. In one aspect, the invention may include an automatic controller, for example, a PID controller, personal computer, or PLC controller adapted to regulate the pressure in the hose. For example, the predetermined preload and the parameters of the bearing being loaded may be entered into the controller and, after mounting a rod similar to rod 40, housing 42 and a press mechanism to bearing 16 (e.g., an inner race thereof), the controller may automatically ramp up the fluid pressure to provide the desired preload or to verify an existing preload. This aspect of the invention may be suitable for production line applications, among others.

In one aspect, the fluid provided by the hose may be provided by a pressure increasing device, for example, a pressure intensifier, that is, a device that converts one pressure to a higher pressure. For example, the pressure-increasing device may be provided with a pressure supply of, for example, 100 psig (for instance, shop air) and increased to, for example, 2000 psig hydraulic fluid, which is then supplied to the hose. Other sources of high-pressure fluid may be provided according to aspects of the invention.

Aspects of the invention may also be used to evaluate the preload or endplay on an existing bearing or bearing assembly. For example, an existing truck hub assembly may be evaluated for its existing preload and compared to the desired preload, and, if necessary, adjusted accordingly. First, the truck may be jacked up, if needed. (The hub may be allowed to cool, if necessary). Apparatus 20 may then be mounted to bearing 16 and spindle 14 (with reference to FIGS. 1-4) and the press mechanism 44 actuated to introduce tension to spindle 14 and compression to bearing 16. (The wheel may be removed.) Press mechanism 44 may be regulated to, for example, vary the fluid pressure, to gradually increase the preload on bearing 16. While the load is increased, a mechanic can repeatedly check the load on or the "tightness" of nut 11. When nut 11 begins to loosen, the existing preload on bearing 16 has been met or exceeded. A comparison of the actual preload indicated by press mechanism 44, for example, the fluid pressure, with the desired preload can then be made. Any adjustments to the preload, either higher or lower, can be made according to the procedures described above and in U.S. Pat. No. 7,389,579.

Although aspects of the present invention were described above with respect to their application to wheel hub assemblies, for example, truck wheel hub assemblies, it is understood that aspects of the present invention may be applied to any vehicle, machine, or component having at least one bearing. Further, although press mechanism 44 is described above as applying a compressive load to an inner race of a bearing, such load could be applied elsewhere to the bearing or wheel assembly 10 such that a frictional or other load on a retaining nut is reduced to allow rotation of a retaining nut. Such rotation may allow teeth of the nut and teeth of a keeper to be aligned with each other to allow engagement of a shaft engaging portion of the keeper with a shaft, (e.g., a shaft slot thereof) to inhibit rotation of the nut relative to the shaft.

While several aspects of the present invention have been described and depicted herein, alternative aspects may be effected by those skilled in the art to accomplish the same objectives. Accordingly, it is intended by the appended claims to cover all such alternative aspects as fall within the true spirit and scope of the invention.

The invention claimed is:

1. A method for use in providing a load on a bearing mounted to a shaft, the method comprising:
   mounting an attaching mechanism to an end of the shaft;
   coupling a press mechanism to the attaching member, the press mechanism configured to provide a compressive load to the bearing; and
   inserting an aligning arm of the press mechanism within a shaft slot of the shaft to align the press mechanism relative to the shaft;
   the aligning arm comprising a free end extending distally past a distalmost extent of the attaching member in a distal direction, wherein a proximal direction extends toward the press mechanism from the shaft, the distal direction being opposite from the proximal direction and extending toward the shaft from the press mechanism.

2. A method for use in providing a load on a bearing mounted to a shaft, the method comprising:
   mounting an attaching mechanism to an end of the shaft;

coupling a press mechanism to the attaching member, the press mechanism configured to provide a compressive load to the bearing;

inserting an aligning arm of the press mechanism within a shaft slot of the shaft to align the press mechanism relative to the shaft; and providing a compressive load to the bearings by a plurality of extensions of the press mechanism by engaging the extensions with an inner race of the bearing.

3. A method for use in providing a load on a bearing mounted to a shaft, the method comprising:

mounting an attaching mechanism to an end of the shaft;

coupling a press mechanism to the attaching member, the press mechanism configured to provide a compressive load to the bearing;

inserting an aligning arm of the press mechanism within a shaft slot of the shaft to align the press mechanism relative to the shaft; and engaging a lock nut with the shaft and rotating the lock nut to a particular position by aligning a plurality of markings on an outside surface of the nut with the aligning arm.

4. The method of claim 1 further comprising monitoring the load provided to the bearing.

* * * * *